3,100,793
STABILIZED CYANOETHOXY ALCOHOLS
Robert E. Leech and William F. Goldsmith, South Charleston, W. Va., assignors to Union Carbide Corporation, a corporation of New York
No Drawing. Filed Apr. 13, 1960, Ser. No. 21,857
8 Claims. (Cl. 260—465.6)

This invention relates to a process for stabilizing cyanoethoxy alcohols. In the particular aspect, this invention relates to the preparation of stabilized cyanoethoxy alcohols which are useful for the manufacture of acrylate esters.

A convenient industrial method for producing esters of $\alpha,\beta$-unsaturated acids and cyanoethoxy alcohols is illustrated by the following reaction sequence for the preparation of 2-(2-cyanoethoxy)ethyl acrylate:

$CH_2=CHCN + HOCH_2CH_2OH \rightarrow$
$\qquad CNCH_2CH_2OCH_2CH_2OH$
$CNCH_2CH_2OCH_2CH_2OH + CH_2=CHCO_2C_2H_5 \rightarrow$
$\qquad CNCH_2CH_2OCH_2CH_2O_2CCH=CH_2 + C_2H_5OH$ The preparation of 3-(2-hydroxyethoxy)propionitrile and the subsequent preparation of 2-(2-cyanoethoxy)ethyl acrylate by the transesterification according to the above synthesis scheme are described in United States Patents Nos. 2,669,558 and 2,720,512.

The production of 2-(2-cyanoethoxy)ethyl acrylate as illustrated and similar acrylate esters proceeds satisfactorily until atempts are made to refine the crude acrylate ester product. During the distillation, insoluble polymer is formed in the kettle, and in the still-column and stillhead. Attempts to prevent this polymerization by the addition of various inhibitors into the distillation system have been unsuccessful.

The cause of the polymerization is attributable to the presence of peroxidized cyanoethoxy alcohol in the transesterification reaction medium. The peroxides decompose during the refining distillation to form free radicals which initiate polymerization of the acrylate ester. Cyanoethoxy alcohols are extremely susceptible to peroxidation on exposure to air. The rigorous exclusion of air during processing on a large scale at subatmospheric pressure is virtually impossible.

Hence, it is a main object of this invention to provide a practical method for producing cyanoethoxy alcohols which are stable to prolonged exposure to air and remain substantially free of peroxides.

Accordingly, this invention is based on the discovery that cyanoethoxy alcohols can be stabilized against oxidative decomposition or degradation by the incorporation therein of minor amounts of phenothiazine during the course of their production.

More specifically, in a process for producing cyanoethoxy alcohols which comprises reacting an acrylonitrile with alkylene glycol or oxyalkylene glycol in the presence of an alkaline catalyst, this invention relates to an improvement which comprises adding to the crude reaction product at a pH between about 6 and 11 a stabilizing quantity of phenothiazine.

Cyanoethoxy alcohols stabilized according to the process of the present invention exhibit a greatly reduced susceptibility to the oxidative effects of prolonged exposure to air. As demonstrated hereinafter in the examples, by the practice of the present invention it is possible to produce stabilized cyanoethoxy alcohols which remain completely free of peroxide formation.

The term "an acrylonitrile" as used herein refers to $\alpha,\beta$-olefinically unsaturated nitriles which are capable of reacting with a glycol under alkaline conditions to form cyanoethoxy alcohols. Such unsaturated nitriles are exemplified by compounds such as acrylonitrile, methacrylonitrile, $\alpha$-chloroacrylonitrile, $\alpha$-trifluoromethylacrylonitrile, and the like.

The term "alkylene glycol" as used herein refers to alkylene and oxyalkylene dihydric alcohols. Illustrative of these compounds are ethylene glycol, propylene glycol, 1,3-propanediol, butylene glycol, 1,4-butanediol, pentylene glycol, diethylene glycol, dipropylene glycol, triethylene glycol, tripropylene glycol, mixed oxyethylene-oxypropylene glycols, and the like. The alkylene glycols preferably contain between two and about ten carbon atoms.

The term "cyanoethoxy alcohols" as used herein refers to the cyanoethoxy alkanols produced by the condensation of an acrylonitrile and an alkylene glycol as defined hereinabove. The term "alkanols" includes oxyalkanols. The cyanoethoxy alcohols are characterized as containing between five and about fifteen carbon atoms.

Cyanoethoxy alcohols particularly amenable to the stabilizing method of the present invention are those prepared by the condensation of acrylonitrile with dihydric alcohols of ethane, propane and butane.

In the application of the present invention, an acrylonitrile and an alkylene glycol are initially condensed in the presence of an alkaline catalyst, such as an alkali metal hydroxide or alcoholate, according to standard processes for the production of cyanoethoxy alcohols. The stabilizer of this invention is subsequently dissolved in the crude reaction product upon completion of the condensation reaction, and during or immediately following the neutralization of the alkaline catalyst. Desirably, an inert (oxygen-free) atmosphere, such as nitrogen or argon, is maintained in the reaction system at least until the addition of stabilizer is complete, and preferably until the final product is isolated. The occurrence of unwanted side reactions is thereby minimized.

Neutralization of the alkaline catalyst is conventionally achieved by the suitable addition of acid, such as phosphoric acid, concentrated sulfuric acid or concentrated hydrochloric acid, to the crude reaction product. Of prime importance to the process of this invention is the introduction of stabilizer after the pH of the crude reaction product has been adjusted, e.g., by the addition of acid, to within a range of from approximately 6 to 11. For purposes of the present invention, the pH values are generally determined by measuring the pH of a five percent by weight mixture or solution of the crude reaction product with water. Preferably, the stabilizer is added when the pH of the crude reaction product has been adjusted to within a range of from approximately 7 to 8. Optimum results may thereby be achieved. The addition of stabilizer to the crude reaction product at a pH of less than about 6, or greater than about 11, however, has not proved of substantial value to the prevention of oxidative decomposition or degradation in cyanoethoxy alcohols.

It is essential that no significant time lapse occur between the complete neutralization of the alkaline catalyst and the subsequent addition of stabilizer, since the existence of unstabilized material in a neutral or acidic medium (at a pH of 7 or less) for a prolonged period of time serves generally to impair the effectiveness of the present process. When it is desired to add the stabilizer to the crude reaction product at a pH of about 7 or less, the stabilizer should accordingly be introduced within not more than about one hour after neutralization. The addition of stabilizer within periods of less than thirty minutes after neutralization is preferred in order to achieve a maximum inhibitive effect against oxidation.

The stabilizer may be added as a solid, soluble compound, or as a solution in which the stabilizer is dissolved in the particular cyanoethoxy alcohol, or any non-reactive organic solvent such as diisopropyl ether, benzene, toluene, and the like. Preferably, the stabilizer is added to the crude reaction product in a concentration of from about 100 to 5000 parts of stabilizer per million parts of cyanoethoxy alcohol by weight. This concentration requirement is not narrowly limited, however, and any concentration of above approximately 10 parts of stabilizer per million parts of cyanoethoxy alcohol by weight may be employed in the process of the invention with satisfactory results. The use of concentrations below approximately 10 parts of stabilizer per million parts of cyanoethoxy alcohol by weight is generally not effective in stabilizing the cyanoethoxy alcohol against oxidation; while no commensurate advantage may be gained by an increase in stabilizer concentration above approximately 5000 parts of stabilizer per million parts of cyanoethoxy alcohol by weight.

The addition of stabilizer may be carried out at any temperature within a range of from about the melting point of the cyanoethoxy alcohol to 150° C. Especially good results may be obtained by the addition of stabilizer at a temperature of from 60° C. to 90° C. At temperatures above approximately 150° C., however, the disadvantage of increasing thermal decomposition of the cyanoethoxy alcohol unfortunately overcomes the advantage of stabilization afforded by the process of the invention.

When the addition or dissolution of stabilizer is complete, the pH of the crude reaction product is adjusted to a final desired level in accordance with standard processes for the production of cyanoethoxy alcohols. Generally, this final pH value is within a range of from approximately 5 to 6. The cyanoethoxy alcohol incorporating the dissolved stabilizer may then be recovered by any convenient method such as distillation. When the stabilized product is distilled there may be some carryover of stabilizer into the distillate which maintains the product in stabilized condition. It is advantageous, however, to add more stabilizer to the distillate as required to provide the concentration recommended herein. If desired, stabilizer as a dilute solution in the particular cyanoethoxy alcohol involved, can be introduced into the still overhead during the distillation so as to be distributed between the reflux and the distillate. This prevents any possible formation of peroxides in the product reflux.

The stabilized cyanoethoxy alcohols of the present invention can be stored or employed in processes for the production of polymerizable acrylate-type esters with little or no accompanying oxidizing decomposition or degradation. Acrylate esters produced from the stabilized cyanoethoxy alcohols of this invention can be distilled under severe conditions without formation of polymer by-product.

The following examples will serve to illustrate specific embodiments of the invention.

Experimental samples were submitted to accelerated oxidation tests to evaluate the ability of a stabilizer to prevent the formation of peroxides in cyanoethoxy alcohol product. The samples to be evaluated were placed in heat-resistant glass pressure bottles. Each bottle was purged thoroughly with oxygen and then stoppered. Then the bottles were placed in a constant temperature bath heated to the desired temperature. Periodically, the samples were analyzed for peroxide content. After each analysis, the bottles again were purged thoroughly with oxygen. This procedure was repeated until the tests were discontinued.

PEROXIDE CONTENT DETERMINATION

A mixture of 25 milliliters of glacial acetic acid, and 25 milliliters of distilled water, were introduced into each of the required number of clean 250 milliliter Erlenmeyer flasks. One of the flasks was reserved for the blank determination. Into each of the other flasks, 25 grams of the compound to be analyzed was introduced, weighed to the nearest 0.1 gram. 2.0 milliliters of 10 percent aqueous potassium iodide solution was added to each flask, including the blank. The flasks were allowed to stand for fifteen minutes at a temperature of about 25° C. in a place protected from light. Each flask was titrated with 0.01 normal sodium thiosulfate until the disappearance of the yellow color. The peroxide content, expressed in parts per million was calculated using the following equation:

$$\frac{(A-B)N \times 1.7 \times 10,000}{\text{gram sample}} = \text{parts per million proxide, calculated as } H_2O_2$$

$A$ = ml. of N normal sodium thiosulfate required for the sample.
$B$ = ml. of N normal sodium thiosulfate required for the blank.
$N$ = normality of standard sodium thiosulfate.

*Example 1*

This example illustrates the preparation of 3-(2-hydroxyethoxy)propionitrile and the use of phenothiazine as a stabilizer for preventing the formation of peroxides in the product.

A reactor was charged with 8080 grams of ethylene glycol and 58 grams of solid potassium hydroxide. The mixture was heated with stirring to a temperature of 50° C., then 3450 grams of acrylonitrile was added over a period of four hours. After the addition of acrylonitrile was completed, the mixture was digested for one hour at 50° C. The crude reaction product was cooled to room temperature and the alkaline catalyst was neutralized by the addition of concentrated sulfuric acid until the pH of the crude reaction product was approximately $7.5 \pm 0.5$. The partially neutralized crude reaction product was separated into 3000-gram samples. Each sample of crude 3-(2-hydroxyethoxy)propionitrile was then stabilized individually by the addition of 3.0 grams of various stabilizers. One unstabilized control sample was prepared without the incorporation of stabilizer. Concentrated sulfuric acid was added to the control sample and to each of the samples containing dissolved stabilizer until the pH of each was approximately $4.5 \pm 0.5$. Each of the samples was refined separately by fractional distillation under reduced pressure. During the refining distillation of each stabilized sample, an additional amount of the stabilizer utilized was fed to the still overhead as a 5.0 percent solution in 3-(2-hydroxyethoxy)propionitrile. The stabilizer thus was distributed between the reflux and the distillate so that the 3-(2-hydroxyethoxy)propionitrile was stabilized in all areas of the still column. The amount of stabilizer fed was equal in each instance to about 0.05 percent of the total still overhead (boil-up). Enough additional stabilizer was added to the distillate to bring the total concentration of each stabilizer to 0.10 percent by weight of the distillate. The pH of each refined 3-(2-hydroxyethoxy)propionitrile fraction was adjusted to approximately $4.5 \pm 0.5$ by the addition of concentrated sulfuric acid. Table I contains a summary of the data obtained when the products of this experiment were analyzed for evidence of peroxides formed by the action of atmospheric oxygen on the products. The stabilized samples are compared with the control sample in an accelerated oxidation test at 100° C. The data demonstrate that phenothiazine has the ability to stabilize cyanoethoxy alcohols against oxidative degradation.

TABLE I

| Stabilizer, 0.1 weight percent | Peroxide content, p.p.m. calculated as $H_2O_2$ | | | |
| --- | --- | --- | --- | --- |
| | 0 hours | 24 hours | 72 hours | 96 hours |
| None (control) | Nil | 1.3 | 428.0 | 838.0 |
| Hydroquinone | Nil | 3.2 | 88.6 | 113.5 |
| CKR 2432 [1] | Nil | 1.9 | 19.6 | 21.9 |
| Phenothiazine | Nil | 1.3 | 2.6 | 8.6 |

[1] CKR 2432 is Bakelite p-tertiarybutylphenol-formaldehyde resin.

Example 2

In a manner similar to that described in Example 1, both stabilized and unstabilized cyanoethylation reaction products of propylene glycol are prepared, utilizing phenothiazine as the stabilizer. The stabilized sample is compared to the unstabilized control sample in an accelerated oxidation test at 100° C., and it is found that the stabilized sample remains substantially free of peroxides while the control sample has a peroxide content which rapidly increases with time.

Example 3

This example is a further illustration of the ability of phenothiazine to stabilize cyanoethoxy alcohols.

In a manner similar to Example 1 stabilized and unstabilized cyanoethylation products are prepared by the condensation of acrylonitrile with 1,4-butanediol in the presence of an alkaline catalyst. Phenothiazine is incorporated in the product as a stabilizer. The preparations are tested for evidence of oxidation after elapsed periods of time during which the material is stored at elevated temperature while under an atmosphere of oxygen. The stabilized sample remains substantially free of peroxides while the control sample has a peroxide content which rapidly increases with time.

In the same manner as Example 1, cyanoethoxy alcohols are prepared by the condensation of methacrylonitrile, α-chloroacrylonitrile and α-trifluoromethylacrylonitrile with propylene glycol, pentylene glycol, diethylene glycol, dipropylene glycol and triethylene glycol. These materials are stabilized by incorporating therein between about 100 and 5000 parts by weight, per 1,000,000 parts of the respective products, of phenothiazine. These stabilized products exhibit stability to the action of atmospheric oxygen.

Example 4

This example illustrates the preparation of an unstabilized cyanoethoxy alcohol and the unsatisfactory results obtained when the unstabilized product is employed in the production of a polymerizable acrylate ester.

A charge of 8080 grams of ethylene glycol and 58 grams of potassium hydroxide was added to a reactor. The mixture was heated with stirring to a temperature of 50° C., then acrylonitrile (0.5 mole per mole of glycol) was added over a period of four hours. After the addition of acrylonitrile was completed, the mixture was cooled to room temperature. Concentrated sulfuric acid was added to the crude product until the pH of the mixture was about 5, then the mixture was refined by fractional distillation under reduced pressure. The yield of 3-(2-hydroxyethoxy)propionitrile was 4850 grams, corresponding to 66.4 percent to the theoretical based on the acrylonitrile.

The unstabilized 3-(2-hydroxyethoxy)propionitrile was utilized in the synthesis of 2-(2-cyanoethoxy)ethyl acrylate. The charge to the reactor consisted of 806 grams of 3-(2-hydroxyethoxy)propionitrile, 11 grams of methylene blue, 11 grams of hydroquinone, 1401 grams of ethyl acrylate and 44.2 grams of conventional transesterification catalyst. The mixture was refluxed and the ethanol-ethyl acrylate azeotrope was removed as formed. During the reaction period air was sparged into the kettle contents at a rate about equivalent to 60 percent of the kettle volume per hour. When the transesterification reaction was completed, the crude 2-(2-cyanoethoxy)ethyl acrylate was fractionally distilled at reduced pressure. The distillation had to be discontinued because of the formation of polymer in the kettle, column and head of the still.

When the same procedure is carried out with 3-(2-hydroxyethoxy)propionitrile stabilized with 0.1 weight percent of phenothiazine, the formation of polymeric byproduct is suppressed during the fractional distillation of the crude 2-(2-cyanoethoxy)ethyl acrylate product, even when exposed to these exaggerated conditions.

What is claimed is:

1. A composition consisting essentially of phenothiazine and a reaction mixture containing an alcohol selected from the group consisting of a cyanoethoxy alkanol and a cyanoethoxy oxyalkanol, each of said alkanols containing from 5 to about 15 carbon atoms, said phenothiazine being present in an amount of at least 10 parts per million parts of said alcohol; and said reaction mixture having a pH adjusted to within the range of about 6 to 11 prior to addition of said phenothiazine.

2. The composition of claim 1 wherein said cyanoethoxy alcohol is 3-(2-hydroxyethoxy)propionitrile.

3. The composition of claim 1 wherein said cyanoethoxy alcohol is 3-(4-hydroxybutoxy)propionitrile.

4. The composition of claim 1 wherein said cyanoethoxy alcohol is 3-(2-hydroxypropoxy)propionitrile.

5. In a process for the production of an alcohol selected from the group consisting of cyanoethoxy alkanol and cyanoethoxy oxyalkanol, each of said alkanols containing from 5 to about 15 carbon atoms and prepared by the reaction of an $\alpha,\beta$-olefinically unsaturated nitrile and a member selected from the group consisting of an alkylene glycol and a oxyalkylene glycol respectively in the presence of an alkaline catalyst; the steps of adjusting the pH of the reaction mixture wherein said alcohol is formed to within the range of from 6 to 11 and thereafter incorporating in said reaction mixture, phenothiazine in an amount by weight of at least 10 parts thereof per million parts of said alcohol.

6. The process of claim 5 wherein the product alcohol is the cyanoethoxy alkanol, 3-(2-hydroxyethoxy)propionitrile.

7. The process of claim 5 wherein the product alcohol is the cyanoethoxy alkanol, 3-(4-hydroxybutoxy)propionitrile.

8. The process of claim 5 wherein the product alcohol is the cyanoethoxy alkanol, 3-(2-hydroxypropoxy)propionitrile.

References Cited in the file of this patent

UNITED STATES PATENTS

| | | |
|---|---|---|
| 2,401,607 | Bruson | June 4, 1946 |
| 2,495,214 | Crews | Jan. 24, 1950 |
| 2,809,988 | Heininger | Oct. 15, 1957 |
| 2,853,510 | Montagna et al. | Sept. 23, 1958 |

FOREIGN PATENTS

| | | |
|---|---|---|
| 581,994 | Great Britain | Oct. 31, 1946 |

OTHER REFERENCES

Murphy et al.: Industrial and Engineering Chemistry, 42 (1950), pages 2479–2489; photocopy in 260–402. (Copy in Scientific Library.)